United States Patent Office 3,258,399
Patented June 28, 1966

3,258,399
METHOD OF INDUCING CENTRAL NERVOUS SYSTEM STIMULATION
Claude I. Judd, Mequon, and Alexander E. Drukker, Milwaukee, Wis., assignors to Colgate-Palmolive Company, New York, N.Y., a corporation of Delaware
No Drawing. Original application Sept. 13, 1962, Ser. No. 223,530. Divided and this application Apr. 22, 1963, Ser. No. 278,507
4 Claims. (Cl. 167—65)

This application is a divisional of Serial Number 223,530, filed September 13, 1962.

This invention relates to novel chemical compounds and processes of preparing the same. More particularly, this invention is concerned with novel basic dibenzsuberane derivatives, processes of producing such compounds and pharmaceutical uses therefor.

According to the present invention there are provided novel basic 10,11-dihydro-5H-dibenzo[a,d]cycloheptene derivatives of the formula

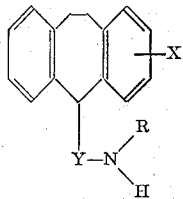

and nontoxic pharmaceutically acceptable acid addition salts thereof, wherein X is hydrogen, chlorine or trifluoromethyl, Y is a straight or branched chain lower alkylene, advisably of 2 to 4 carbons, such as ethylene, propylene, isopropylene and butylene, and R is a straight or branched chain lower alkyl, advisably of 1 to 3 carbons, such as methyl, ethyl, propyl and isopropyl.

One of method of producing these compounds is to react a 5-(N-alkyl-N-benzylaminoalkyl)-10,11-dihydro-5H-dibenzo[a,d]cycloheptene with a chloroformate to produce an intermediate 5-(N-alkyl-N-substituted carboxy-aminoalkyl) - 10,11 - dihydro - 5H - dibenzo[a,d]-cycloheptene which upon hydrolysis yields 5-(N-alkyl-aminoalkyl) - 10,11 - dihydro - 5H - dibenzo[a,d]cycloheptene. This process can be represented as follows:

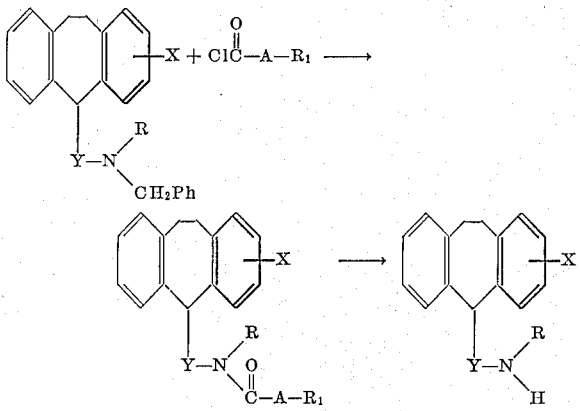

wherein Ph is phenyl, A is oxygen or sulfur, $R_1$ is a lower alkyl such as methyl, ethyl and propyl or phenyl and R, Y and X have the previously assigned meaning. The J. Org. Chem. 26, 4057 (1961), illustrates related applications of this process.

Some of the starting materials which can be used in the process are 5-(3-N-methyl-N-benzylamino)propyl-10,11-dihydro-5H-dibenzo[a,d]cycloheptene,
3-chloro-5-(3-N-methyl-N-benzylamino)propyl-10,11-dihydro-5H-dibenzo[a,d]cycloheptene,
5-(2-N-ethyl-N-benzylamino)ethyl-10,11-dihydro-5H-dibenzo[a,d]cycloheptene and
5-(3-N-methyl-N-benzylamino)butyl-10,11-dihydro-5H-dibenzo[a,d]cycloheptene.

Among the chloroformates which can be used in the first step of the process are methyl chloroformate, ethyl chloroformate, phenyl chloroformate, methylthiachloroformate, ethylthiachloroformate and phenylthiachloroformate.

The debenzylation reaction is readily effected by bringing the reactants together in a suitable inert solvent at from about room temperature to about 200° C. Benzene is a particularly useful reaction medium and with it a reaction temperature of about 80° C. is suitable. Preferably, the reaction mixture is refluxed for about 5 to 20 hours before reaction is terminated. The intermediate carbamate is isolated from the reaction mixture by conventional methods.

Some of the intermediates produced in this way are 5-(3-N-methyl-N-carbethoxyamino)propyl-10,11-dihydro-5H-dibenzo[a,d]cycloheptene,
3-chloro-5-(2-N-ethyl-N-carbomethoxyamino)ethyl-10,11-dihydro-5H-dibenzo[a,d]cycloheptene,
5-(3-N-propyl-N-phenoxycarbonylamino)butyl-10,11-dihydro-5H-dibenzo[a,d]cycloheptene and
5-(3-N-methyl-N-ethylthiacarbonyl)propyl-10,11-dihydro-5H-dibenzo[a,d]cycloheptene.

The ester group on such intermediates can be cleaved by acid or base hydrolysis and preferably with a weak base such as barium hydroxide or a weak acid such as acetic acid or hydrobromic acid. The rate of hydrolysis is increased by heating the hydrolysis mixture, such as at reflux. Following the hydrolysis the reaction mixture can be neutralized and the product extracted.

Representative of the products produced in this way are 5-(3-N-methylamino)propyl-10,11-dihydro-5H-dibenzo-[a,d]cycloheptene,
3-chloro-5-(3-N-ethylamino)propyl-10,11-dihydro-5H-dibenzo[a,d]cycloheptene,
5-(2-N-propylamino)ethyl-10,11-dihydro-5H-dibenzo-[a,d]cycloheptene and
5-(3-N-methylamino)butyl-10,11-dihydro-5H-dibenzo-[a,d]cycloheptene.

The compounds of this invention can also be produced by catalytic debenzylation of a 5-(N-alkyl-N-benzylaminoalkyl) - 10,11 - dihydro - 5H - dibenzo[a,d]cycloheptene to form the 5 - (N - alkylaminoalkyl) - 10,11-dihydro-5H-dibenzo[a,d]cycloheptene. This process can be represented as follows:

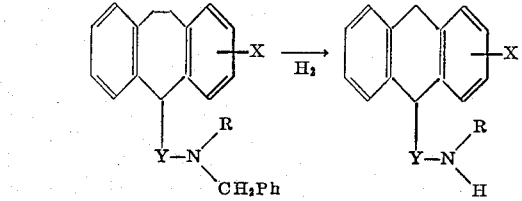

wherein Ph, X, Y and R have the assigned meaning.

The catalytic hydrogenation can be accomplished by adding a 5 - (N - alkyl - N - benzylaminoalkyl) - 10,11-dihydro - 5H - dibenzo[a,d]cycloheptene, preferably as an acid addition salt such as the hydrochloride, to a suitable solvent such as water or a lower alcohol. Platinum, platinum oxide and palladium are catalysts which are useful in effecting the hydrogenation. Hydrogen pressures of about 30 to 3,000 p.s.i. and from room temperature to moderately elevated temperatures (100° C.) are suitable for effecting the reaction. The hydrogenation proceeds quickly and its progress can be measured by the hydrogen uptake. When the hydrogen uptake ceases the reaction may be considered completed. After filtering the reaction mixture, it may be evaporated to dryness and the product triturated with a solvent such as ether and separated by filtration.

The compounds of this invention can also be produced by catalytic reduction, using the conditions just described, of 5 - (N - alkyl - N - benzylaminoalkylidene) - 10,11-dihydro - 5H - dibenzo[a,d]cycloheptenes of the formula

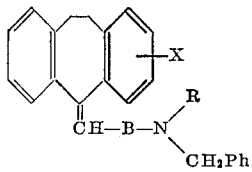

and 5 - (N - alkyl - N - benzylaminoalkylidene) - 5H-dibenzo[a,d]cycloheptenes of the formula

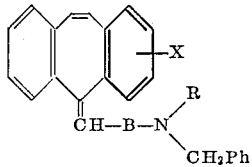

wherein X, R and Ph have the previously assigned meaning and B is a straight or branched lower alkylene of 1 to 5 atoms, and advisably of 1 to 3 carbons.

Each of these reductions can be specifically illustrated as follows:

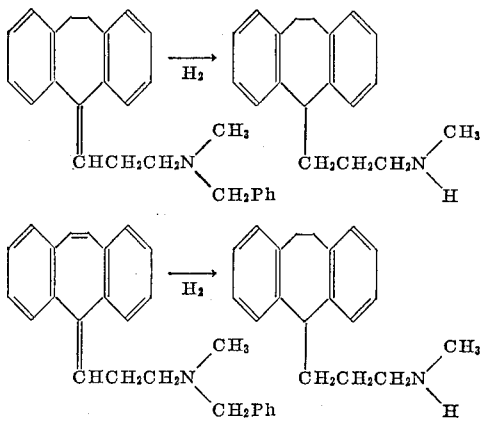

wherein Ph is phenyl.

The compounds of this invention form water soluble acid addition salts with organic and inorganic acids such as hydrochloric acid, hydrobromic acid, sulphuric acid, phosphoric acid, methane sulphonic acid, ethane disulphonic acid, acetic acid, citric acid, maleic acid, succinic acid, tartaric acid, benzoic acid and phthalic acid.

Since the compounds form acid addition salts, they can be used as neutralizing agents.

The compounds of this invention, as the free bases and nontoxic acid addition salts thereof, are powerful central nervous system stimulants in animals. This activity is very unexpected in view of publications by Winthrop et al. in J. Org. Chem. 27, 230 (1962), Protiva et al. in J. Med. Pharm. Chem. 4, 411 (1961), Villani et al. in J. Med. Pharm. Chem. 5, 373 (1962), and Engelhardt et al. in Abstract No. 7 of the Division of Medicinal Chemistry, A.C.S. Meeting in Washington, 1962, which report greatly reduced central activity or total loss of central activity in 5-substituted-5H-dibenzo[a,d]cycloheptanes and cycloheptenes lacking exocyclic unsaturation at the 5-carbon atom of the ring.

The compounds provided by this invention can be administered to animals as pure compounds or in the form of nontoxic acid addition salts. To obtain a practical size to dosage relationship one or more of the compounds is usually combined with a suitable pharmaceutical carrier and made into unit-dosage forms.

Pharmaceutical carriers which are liquid or solid can be used. The preferred liquid carrier is water. Flavoring materials can be included in the solutions as desired.

Solid pharmaceutical carriers such as starch, sugar and talc can be used to form powders. The powders can be used as such or be tableted, or be used to fill gelatin capsules. Suitable lubricants like magnesium stearate, binders such as gelatin and disintegrating agents like sodium carbonate in combination with citric acid can be used to form the tablets.

Unit dosage forms such as tablets and capsules can contain any suitable predetermined amount of one or more of the compounds and can be administered one or more at a time at regular intervals. Such forms should, however, contain a concentration of about 0.1 to 10 by weight of the compound of this invention.

A typical tablet can have the composition:

| | Mg. |
|---|---|
| (1) 5 - N - (3 - N - methylamino)propyl - 10,11 - dihydro-5H-dibenzo[a,b]cycloheptene HCl | 25 |
| (2) Starch, U.S.P. | 57 |
| (3) Lactose, U.S.P. | 73 |
| (4) Talc, U.S.P. | 9 |
| (5) Stearic acid | 6 |

Powders 1, 2 and 3 are slugged, then granulated, mixed with 4 and 5, and tableted.

Daily administratiion of about 5 to 500 mg. of 5-N-(3-N-methylamino)propyl - 10,11 - dihydro - 5H - dibenzo [a,d]cycloheptene HCl and other compounds of this invention is usually satisfactory. However, since some variation between compounds is to be expected, the precise dosages of each is to be evaluated prior to administration. Furthermore, the differences in patients normally will require prescription of various amounts of the active drugs from case to case. In general, the indicated treatment of depressives is about 5 to 150 mg. of the active compounds given orally periodically during the day in unit dosages of about 25 to 50 mg. given three times a day.

The following examples are presented to illustrate the preparation of representative compounds within the scope of the invention.

EXAMPLE 1

*5-(3-N-methyl-N-carbethoxyamino)propyl-10,11-dihydro-5H-dibenzo[a,d]cycloheptene*

To a cooled solution of 11.5 g. (0.059 mole) of 10,11-dihydro-5H-dibenzo[a,d]cycloheptene in 90 cc. of tetrahydrofuran was added 40 cc. of commercial butyllithium solution (equivalent to 0.065 mole butyllithium) in 60 cc. of ether. After the solution had been stirred at ambient temperature for 6 hours, a solution of 11.7 g. (0.059 mole) of 3-(N-methyl-N-benzyl)amino-1-chloropropane in 35 cc. of ether was added dropwise. The mixture was left at room temperature for several hours, then washed with water and concentrated. The residue was taken up in benzene, extracted with dilute aqueous hydrochloric acid, the aqueous layers were made alkaline with potassium hydroxide, extracted with ether, dried, filtered and concentrated. The residue of 5-(3-N-methyl-N-benzyl-amino)propyl - 10,11 - dihydro - 5H - dibenzo[a,d]cycloheptene was distilled to give 12.85 g. of product, B.P. 205° C. (0.08 mm.).

A solution of 10.5 g. (0.0296 mole) of 5-(3-N-methyl-N - benzylamino)propyl - 10,11 - dihydro - 5H - dibenzo[a,d]cycloheptene and 3.8 g. (0.035 mole) of ethylchloroformate in 25 cc. of benzene was refluxed for 24 hours. The solution was distilled with steam, the residue dissolved in benzene, the solution washed with dilute hydrochloric acid and water, dried, filtered and concentrated. The residue was distilled to give 7.8 g. of 5-(3-N - methyl - N carbethoxyamino)propyl - 10,11 - dihydro-5H-dibenzo[a,d]cycloheptene, B.P. 214° C. (0.5 mm.).

Analysis.—Calcd. for $C_{22}H_{27}NO_2$: C, 78.30; H, 8.07 N, 4.15. Found: C, 78.32; H, 8.04; N, 4.32.

EXAMPLE 2

5-(3-N-methylamino)propyl-10,11-dihydro-5H-dibenzo[a,d]cycloheptene

A solution of 6.95 g. (0.0206 mole) of 5-(3-N-methyl-N - carbethoxyamino)propyl - 10,11 - dihydro - 5H - dibezo[a,d]cycloheptene and 10.5 g. of barium hydroxide·8H$_2$O in 77.5 cc. of ethylene glycol was stirred and refluxed for 10 hours, cooled, and poured into water. The solid was removed by filtration and both solid and filtrate were extracted with benzene. The combined benzene extracts were extracted with dilute hydrochloric acid, the aqueous extracts were made alkaline with potassium hydroxide, followed by extraction with ether. The ethereal extracts were dried over potassium carbonate, filtered and concentrated to leave 3.75 g. of base. The base was converted to the hydrochloride, and this salt was recrystallized from a mixture of equal amounts of ethanol and diethyl ether. M.P. of the HCl salt: 180° C.

Analysis.—Calcd. for $C_{19}H_{24}ClN$: C, 75.60; H, 8.01; N, 4.64. Found: C, 75.55; H, 7.96; N, 4.64.

Various changes and modifications of the invention can be made and, to the extent that such variations incorporate the spirit of this invention, they are intended to be included within the scope of the appended claims.

What is claimed is:
1. The method of inducing central nervous system stimulation in an animal which comprises the step of orally administering to an animal a small, safe and effective amount of a member of the group consisting of compounds of the formula

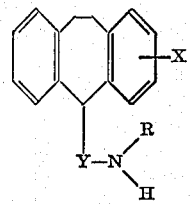

and nontoxic pharmaceutically acceptable acid addition salts thereof, wherein X is a member of the group consisting of hydrogen, chlorine and trifluoromethyl, Y is lower alkylene and R is lower alkyl.

2. The method of inducing central nervous system stimulation in an animal which comprises the steps of orally administering to an animal a small, safe and effective amount of 5-(3-N-methylamino)propyl-10,11-dihydro-5H-dibenzo[a,d]cycloheptene.

3. A unit dosage pharmaceutical composition comprising 5 to 150 mg. of a member of the group consisting of compounds of the formula

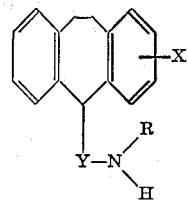

and nontoxic pharmaceutically acceptable acid addition salts thereof, wherein X is a member of the group consisting of hydrogen, chlorine and trifluoromethyl, Y is lower alkylene and R is lower alkyl, and a pharmaceutical carrier.

4. A unit dosage pharmaceutical composition comprising 5 to 150 mgm. of 5-(3-N-methylamino)propyl-10,11-dihydro-5H-dibenzo[a,d]cycloheptene, and a pharmaceutical carrier.

References Cited by the Examiner

FOREIGN PATENTS 613,363 8/1962 Belgium.
858,188 1/1961 Great Britain.

OTHER REFERENCES

Protiva et al.: "Journal of Med. and Phar. Chem., vol. 4, No. 2, pp. 411–15 (1961).

JULIAN S. LEVITT, Primary Examiner.

S. FRIEDMAN, N. MANN, Assistant Examiners.